United States Patent [19]
Park et al.

[11] Patent Number: 6,148,212
[45] Date of Patent: *Nov. 14, 2000

[54] SYSTEM AND METHOD FOR CELLULAR CONTROL OF AUTOMOBILE ELECTRICAL SYSTEMS

[75] Inventors: Chyrel Park, Garland; Walt Evanyk, Plano, both of Tex.

[73] Assignee: Ericsson Inc., Research Triangle Park, N.C.

[ * ] Notice: This patent issued on a continued prosecution application filed under 37 CFR 1.53(d), and is subject to the twenty year patent term provisions of 35 U.S.C. 154(a)(2).

[21] Appl. No.: 08/993,386

[22] Filed: Dec. 18, 1997

[51] Int. Cl.$^7$ ...................................... H04Q 7/22
[52] U.S. Cl. ................. 455/456; 455/410; 455/414; 342/457; 340/426
[58] Field of Search ................... 455/404, 410, 455/414, 557, 456; 340/426, 825.34, 825.36, 825.37, 825.49; 342/457; 701/214

[56] References Cited

U.S. PATENT DOCUMENTS

| | | | |
|---|---|---|---|
| 5,081,667 | 1/1992 | Drori et al. | 455/404 |
| 5,276,728 | 1/1994 | Pagliaroli et al. | 455/404 |
| 5,557,254 | 9/1996 | Johnson et al. | 340/426 |
| 5,629,693 | 5/1997 | Janky | 340/988 |
| 5,731,785 | 3/1998 | Lemelson et al. | 342/357 |
| 5,895,436 | 4/1999 | Savoi et al. | 701/214 |
| 5,917,405 | 6/1999 | Joao | 455/404 |
| 5,950,123 | 9/1999 | Schwelb et al. | 455/414 |

FOREIGN PATENT DOCUMENTS

| | | |
|---|---|---|
| 0 739 777 A2 | 10/1996 | European Pat. Off. . |
| 40 03 091 A1 | 2/1990 | Germany . |
| 42 27 658 C1 | 8/1992 | Germany . |
| 8-07931 | 3/1996 | Japan . |
| WO 97/24005 | 7/1997 | WIPO . |

OTHER PUBLICATIONS

PCT International Search Report dated Apr. 26, 1999.

*Primary Examiner*—Reinhard J. Eisenzopf
*Assistant Examiner*—Duc Nguyen
*Attorney, Agent, or Firm*—Jenkens & Gilchrist, P.C.

[57] ABSTRACT

A telecommunications system and method is disclosed for instructing a device interfaced with a vehicle's electrical system to activate or deactivate specific electrical devices, using the cellular network. This can be accomplished utilizing a mobile terminal or a unit containing the equivalency of a mobile terminal receiver, hereinafter referred to as a "Radio Interface Unit" (RIU), which is interconnected to a "Power Interface Unit" (PIU). The PIU directly interconnects to the vehicle's electrical system and ignition. The subscriber can then access their vehicle's electrical system from anywhere world-wide which reaches the mobile terminal by dialing their cellular phone number or a number associated with the RIU from another wireless or wireline phone. The RIU would then "answer" the call and receive instructions from the subscriber to activate or deactivate electrical devices on the vehicle.

29 Claims, 3 Drawing Sheets

SYSTEM AND METHOD FOR CELLULAR CONTROL OF AUTOMOBILE ELECTRICAL SYSTEMS

BACKGROUND OF THE PRESENT INVENTION

1. Field of the Invention

The present invention relates generally to telecommunications systems and methods for connecting to an automobile's electrical system via a cellular system, and specifically to sending messages, via the cellular system, to a unit interfaced with an automobile's electrical system instructing the unit to access and activate or deactivate specific electrical devices.

2. Background and Objects of the Present Invention

Cellular telecommunications is one of the fastest growing and most demanding telecommunications applications ever. Today it represents a large and continuously increasing percentage of all new telephone subscriptions around the world. A standardization group, European Telecommunications Standards Institute (ETSI), was established in 1982 to formulate the specifications for the Global System for Mobile Communication (GSM) digital mobile cellular radio system.

With reference now to FIG. 1 of the drawings, there is illustrated a GSM Public Land Mobile Network (PLMN), such as cellular network 10, which in turn is composed of a plurality of areas 12, each with a Mobile Services Center (MSC) 14 and an integrated Visitor Location Register (VLR) 16 therein. The MSC/VLR areas 12, in turn, include a plurality of Location Areas (LA) 18, which are defined as that part of a given MSC/VLR area 12 in which a mobile station (MS) (terminal) 20 may move freely without having to send update location information to the MSC/VLR area 12 that controls the LA 18. Each Location Area 12 is divided into a number of cells 22. Mobile Station (MS) 20 is the physical equipment, e.g., a car phone or other portable phone, used by mobile subscribers to communicate with the cellular network 10, each other, and users outside the subscribed network, both wireline and wireless. The MS 20 may also include a Subscriber Identity Module (SIM) card 13, or other memory, which provides storage of subscriber related information, such as a subscriber authentication key, e.g., the International Mobile Subscriber Identity (IMSI) number, temporary network data, and service related data (e.g. language preference).

The MSC 14 is in communication with at least one Base Station Controller (BSC) 23, which, in turn, is in contact with at least one Base Transceiver Station (BTS) 24. The BTS is the physical equipment, illustrated for simplicity as a radio tower, that provides radio coverage to the geographical part of the cell 22 for which it is responsible. It should be understood that the BSC 23 may be connected to several base transceiver stations 24, and may be implemented as a stand-alone node or integrated with the MSC 14. In either event, the BSC 23 and BTS 24 components, as a whole, are generally referred to as a Base Station System (BSS) 25.

With further reference to FIG. 1, the PLMN Service Area or cellular network 10 includes a Home Location Register (HLR) 26, which is a database maintaining all subscriber information, e.g., user profiles, current location information, International Mobile Subscriber Identity (IMSI) numbers, and other administrative information. The HLR 26 may be co-located with a given MSC 14, integrated with the MSC 14, or alternatively can service multiple MSCs 14, the latter of which is illustrated in FIG. 1.

The VLR 16 is a database containing information about all of the Mobile Stations 20 currently located within the MSC/VLR area 12. If a MS 20 roams into a new MSC/VLR area 12, the VLR 16 connected to that MSC 14 will request data about that Mobile Station (terminal) 20 from the HLR database 26 (simultaneously informing the HLR 26 about the current location of the MS 20). Accordingly, if the user of the MS 20 then wants to make a call, the local VLR 16 will have the requisite identification information without having to reinterrogate the HLR 26. In the aforedescribed manner, the VLR and HLR databases 16 and 26, respectively, contain various subscriber information associated with a given MS 20.

In many situations, a subscriber may desire to access and activate or deactivate electrical devices within his or her automobile, or other similar vehicle, such as a motor home, truck, tractor trailer, motorcycle, boat, or plane. For example, if the subscriber has accidentally locked their keys inside the car, parked the car and then not remember if the headlights were turned off or if the car doors were locked, or parked the car in a large parking lot and not remembered where it was parked, the subscriber may wish to have access to various electrical systems, such as door locks, headlights, and the engine. In addition, if the subscriber's car has been stolen, the subscriber may want to know the location of the car or alternatively, may wish to disable the car to prevent the thief from driving it. One convenient way of accessing such electrical systems would be to dial their MS within their car and instruct their MS to activate or deactivate specific electrical devices. Unfortunately, there is currently no existing way of interfacing an MS to an automobile's electrical system.

It is therefore an object of the invention to interface to and control an automobile's ignition and electrical systems via the cellular system.

SUMMARY OF THE INVENTION

The present invention is directed to telecommunications systems and methods for instructing a device interfaced with an automobile's (or any type of vehicle's) electrical system to activate or deactivate specific electrical devices, using the cellular network. This can be accomplished utilizing a mobile terminal or a unit containing the equivalency of a mobile terminal receiver, hereinafter referred to as a "Radio Interface Unit" (RIU), which is interconnected to a "Power Interface Unit" (PIU). The PIU directly interconnects to the automobile's electrical system and ignition. The subscriber can then access their automobile's electrical system from anywhere world-wide which reaches the mobile terminal by dialing their cellular phone number or a number assigned to the RIU from another wireless or wireline phone. The RIU would then "answer" the call and receive the instructions from the subscriber for activating or deactivating specific electrical devices on the automobile, including, but not limited to activating/deactivating the car alarm, turning off the head lights, locking/unlocking car doors, starting the engine, turning on the heater/AC, disabling the engine, or flashing the headlights and/or blowing the horn.

BRIEF DESCRIPTION OF THE DRAWINGS

The disclosed inventions will be described with reference to the accompanying drawings, which show important sample embodiments of the invention and which are incorporated in the specification hereof by reference, wherein.

DETAILED DESCRIPTION OF THE PRESENTLY PREFERRED EXEMPLARY EMBODIMENTS

The numerous innovative teachings of the present application will be described with particular reference to the presently preferred exemplary embodiment. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Figure 1:
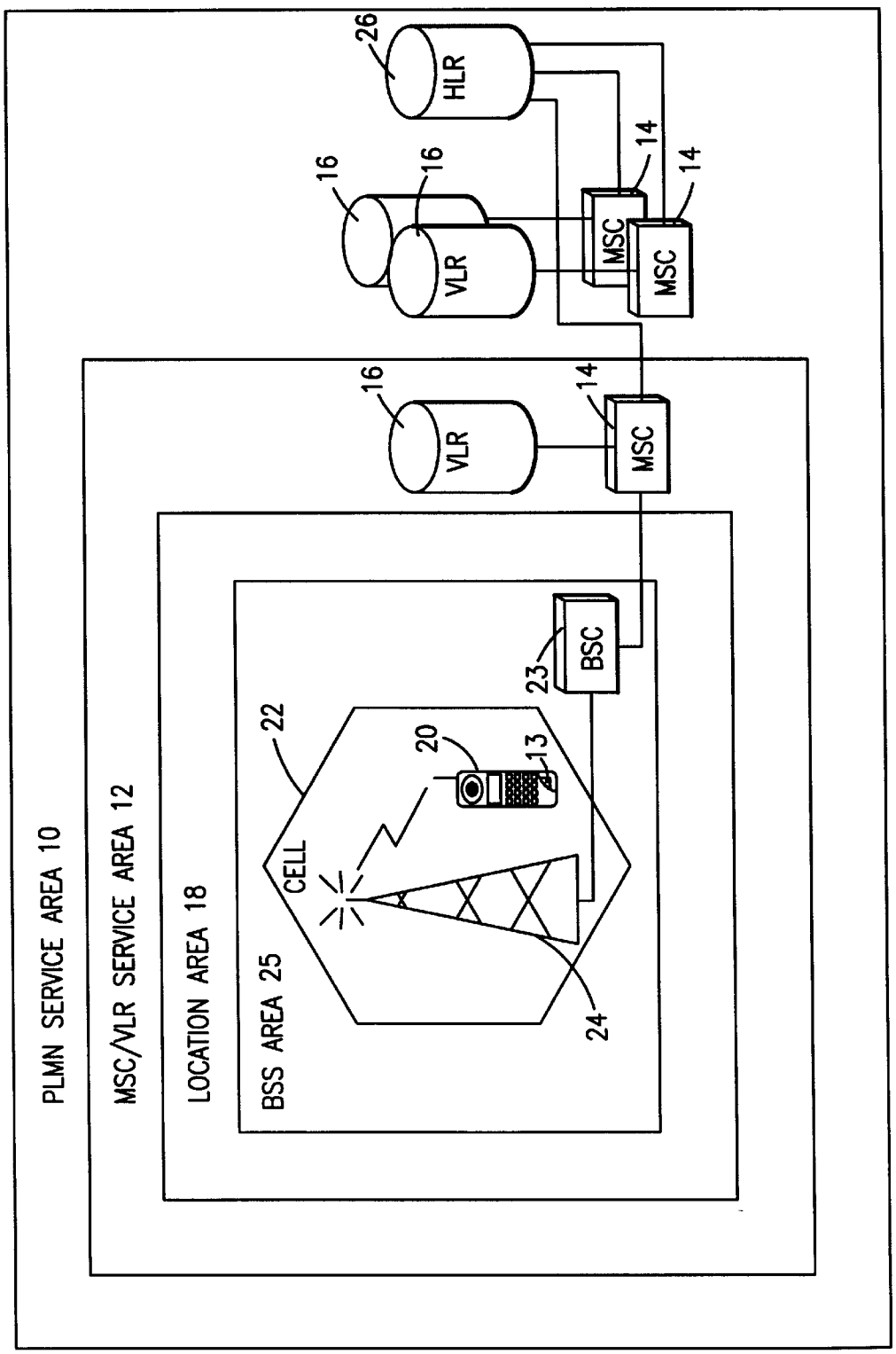
FIG. 1 is a block diagram of a conventional terrestrially-based wireless telecommunications system.
Figure 2:
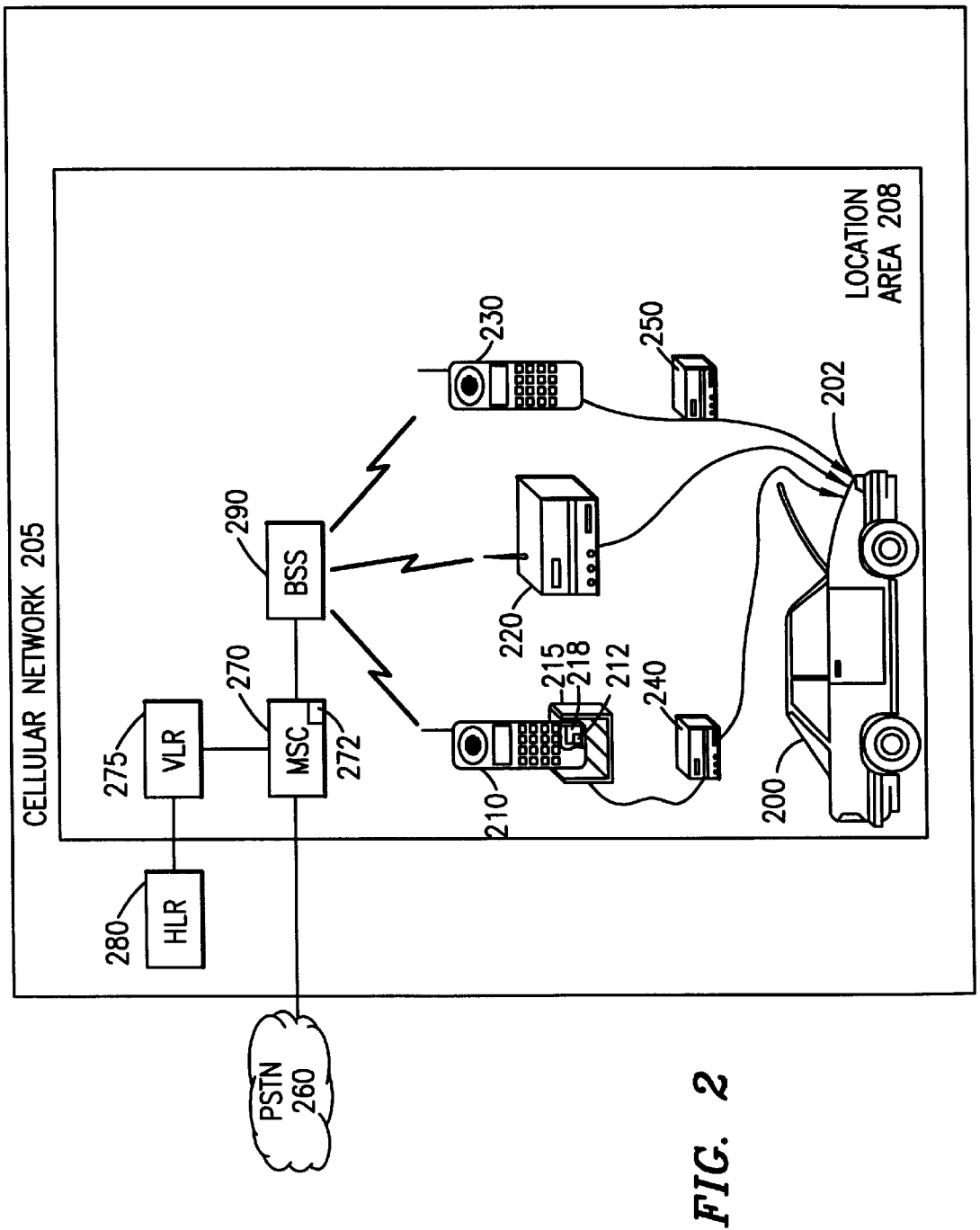
FIG. 2 depicts a cellular interface to an automobile's electrical system for activating or deactivating specific electrical devices in accordance with preferred embodiments of the present invention.

With reference now to FIG. 2 of the drawings, communication to an automobile's electrical system, generally referred to herein by reference numeral 202, via a cellular system 205 can be accomplished using a Mobile Station (MS) 210 or a unit containing the equivalency of a cellular phone receiver, hereinafter referred to as a "Radio Interface Unit" (RIU) 220 and 230, interconnected to a "Power Interface Unit" (PIU) (240, 220 and 250), which interconnects to the automobile's electrical system 202, ignition, etc. When a subscriber dials a phone number associated with the MS 210 or RIU 220 or 230, the MS 210 or RIU 220 or 230 can "answer" the call and receive instructions from the subscriber to access and activate or deactivate various electrical devices within the automobile 200. The subscriber can instruct the MS 210 or RIU 220 or 230 to cause the PIU (240, 220 or 250) to perform a variety of different functions, including, but not limited to: activating/deactivating the car alarm, turning on/off the head lights, locking/unlocking the car doors, starting the engine and turning on the heater/air conditioning, disabling the engine, which can be especially useful if the car has been stolen, or flashing the headlights and/or blowing the horn, which can be useful if the car is parked in a large parking lot. Advantageously, the subscriber can connect to the automobile's electrical system 202 from any location world-wide that provides cellular service to the MS 210 or RIU 220 or 230 within the automobile 200, thereby providing a mechanism to relieve a distant car owner of concerns over their car's status.

In a first embodiment, the subscriber can connect to the automobile's electrical system 202 using an MS 210 located in the automobile 200, as shown in FIG. 2. The MS 210 preferably has normal two-way communication capability and only functions as an interface to the automobile's electrical system 202 when residing in a device similar to a hands-free mount, hereinafter referred to as a "Cell Interface Device" (CID) 215. The CID 215 interconnects to the PIU 240, which activates or deactivates specific electrical devices within the automobile 200.

In a typical scenario, the subscriber can access the automobile's electrical system 202 by dialing the phone number associated with the MS 210. The subscriber can place the call from either another MS (not shown), or a wireline phone within the Public Switched Telephone Network (PSTN) 260, as is understood in the art. After a predetermined number of rings, if the MS 210 is placed within the CID 215, the MS 210 "answers" the call and requests security information from the calling party to prevent unauthorized access to the automobile's electrical system 202. However, if the MS 210 is not within the CID 215, the MS 210 will send a message to the calling party indicating that access to the automobile's electrical system 202 cannot be performed at this time.

When a call to the MS 210 enters the cellular network 205, a Mobile Switching Center (MSC) 270 serving a location area 208 that the MS 210 is in accesses subscriber information associated with that MS 210 from the Visitor Location Register 275, which obtained the information from a Home Location Register 280 when the MS 210 entered the serving area 208. Thereafter, the MSC 270 determines whether the subscriber has purchased the automobile electrical system access feature. If so, the MSC 270 forwards the call to an automobile electrical system access (AESA) system 272 within the MSC 270, which prompts the subscriber for the security information or password. The security information can be, for example, a digit string followed by the pound sign, e.g., XXXX# or other such termination indicia.

This process is similar to a voice mail answering service offered by many service providers. With current voice mail systems, if a subscriber chooses to not answer a call, for instance, a subscriber may not want to be distracted while driving, the call can be forwarded to a voice mail system within the MSC where the calling partly can leave a message. These messages can be retrieved at a later time by the subscriber entering a password and a service code associated with listening to saved messages.

Likewise, with the AESA system 272, once the subscriber enters the correct password, the AESA system 272 again prompts the subscriber for the desired service code. The particular access features can be determined by the service provider or by the subscriber when the service is activated. The AESA system 272 prompts can either be general, in which the system 272 merely asks for any service code, or the prompts can be more user friendly, in which the system 272 offers several options and instructs the subscriber to choose one of the options. The password and service code information can then be sent to the MSC 270 from the subscriber, via a Base Station System 290 serving the location area 208 the MS 210 is in, using either a Short Message Service (SMS) message or an Unstructured Supplementary Service Data (USSD) message.

Once the subscriber's service code is received by the AESA system 272, the service code or instruction is sent to the MS 210 from the MSC 270 via the BSS 290, using an SMS or USSD message, and received into a memory 218, e.g., a Subscriber Identity Module (SIM) card, within the MS 210. The MS 210 then instructs the CID 215, which is connected to the MS 210 and the PIU 240, to instruct the PIU 240 to perform the feature associated with the received service code. Optionally, a message can be sent back to the calling subscriber acknowledging performance of the requested feature. It should be understood that the service provider can charge the subscriber a flat monthly fee for the service, or can charge per minute of use or per use. In addition, roaming charges would apply if the MS/CID 210/215 within the automobile 200 has roamed outside of the home cellular network 205.

Alternatively, the password and service code information 212 can be stored in the SIM card 218 within the MS 210. The MS 210 can be programmed to answer the call after a predetermined number of rings and send the prompts to the calling subscriber through the cellular network 205. The MS 210 can then receive the requested service code and instruct the CID 215 and PIU 240 accordingly, using the stored information 212. Advantageously, the CID 215 could also serve as a charging facility for the MS 210 battery, which would be able to charge the battery while simultaneously instructing the PIU 240 to access the automobile's electrical system 202.

In an alternative embodiment, the CID 215 can be combined with the MS 210, the combination being hereinafter referred to as a Radio Interface Unit (RIU) 230, which is connected directly to the PIU 250. In this embodiment, the RIU 230 can make and receive calls, but it cannot be removed from the automobile 200. Instructions to the automobile's electrical system 202 can be sent to the RIU 230 in the same manner described hereinbefore, which can then instruct the PIU 250 to perform the requested feature.

In still a further alternative embodiment, the RIU 230 and PIU 250 can be combined into one unit 220 which interfaces directly with the automobile's electrical system 202. However, with this embodiment, the RIU/PIU combination 220 cannot be used to place outgoing calls. Instead, only signaling information can be sent to and from the RIU/PIU combination 220. In addition, the RIU/PIU combination 220 can only be implemented with the password and security code information being stored within the cellular network 205, e.g., within the AESA system 272, instead of within the RIU/PIU combination 220 itself. Advantageously, the RIU/PIU combination 220 can be installed underneath the hood of the automobile 200, making it undetectable to persons within the passenger section of the automobile 200. This can be especially useful if the automobile 200 has been stolen and the subscriber wishes to instruct the engine to turn off (or other theft-deterring feature) without alerting the thief.

Figure 3:
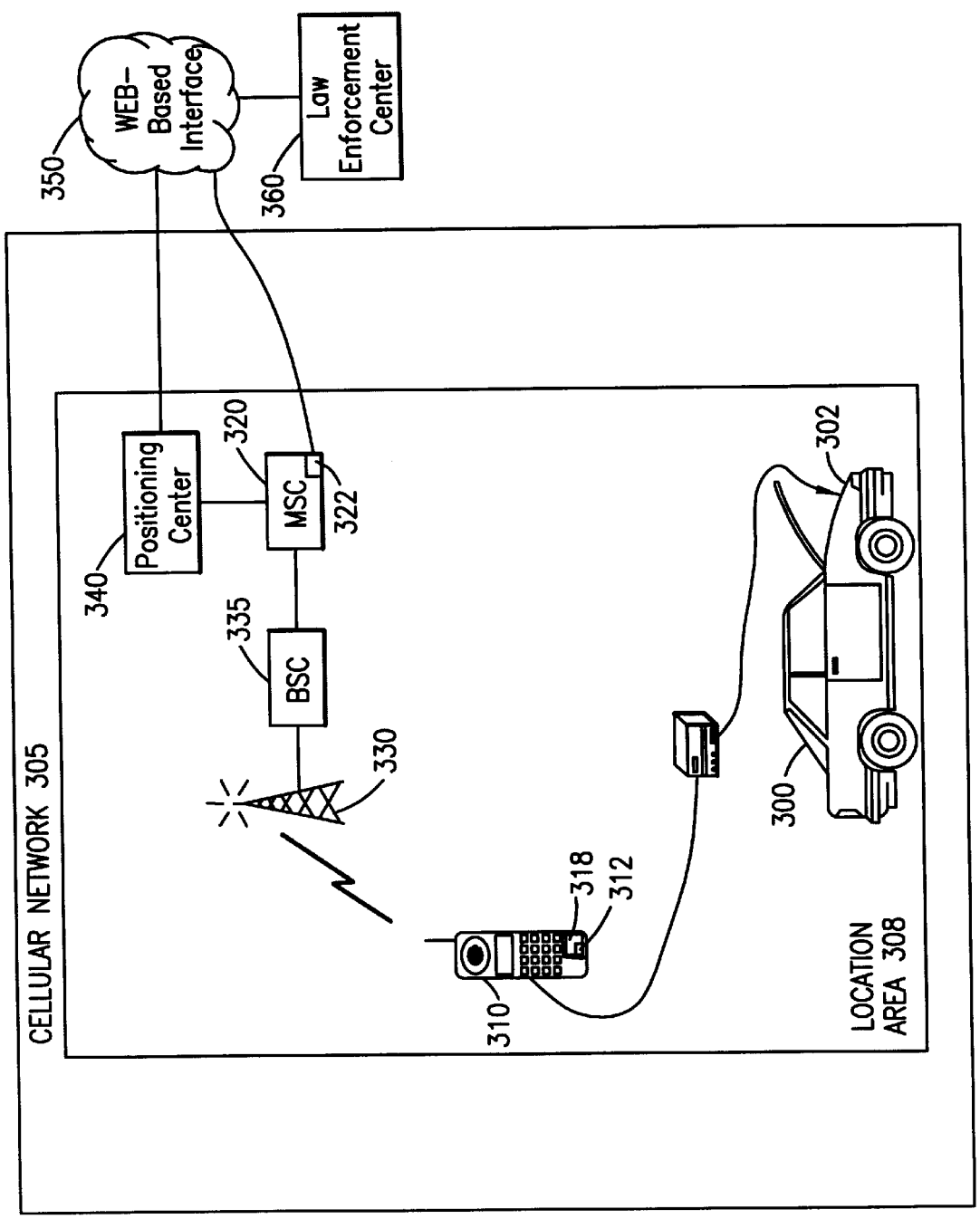
FIG. 3 demonstrates positioning of an automobile using the cellular interface in accordance with preferred embodiments of the present invention.

Another feature which can be added to the subscriber's automobile electrical system access feature is a positioning feature, which would enable the subscriber or police to locate the automobile in the event the automobile has been stolen. With reference now to FIG. 3 of the drawings, when the RIU or MS 310 enters a new location area 308, the RIU 310 "registers" with the MSC 320 serving the area 308 that it is in. If the automobile 300 has been stolen, the subscriber can place a call to the RIU 310, which will be routed to the serving MSC 320, and enter a service code for positioning.

If the password and security code information is stored within the cellular network 305, e.g., the call is forwarded to the AESA system 322, the AESA system 322 can request positioning of the RIU 310 by a positioning center 340, using, for example, positioning data from three Base Transceiver Stations (BTSs) (not all being shown), one of which is the serving BTS 330, via the serving Base Station Controller (BSC) 335, to triangulate the position of the RIU 310. Thereafter, either the positioning center 340 or the AESA system 322 can route the location information to a local law enforcement center 360 through, for example, a WEB-based interface 350. In addition, if the AESA system 322 contains subscriber information pertaining to the make and model of the automobile, such information can also be transmitted to the law enforcement center 360, via the WEB-based interface 350, to assist the police in locating the stolen automobile 300. The location information can be transmitted to the police 360 at regular intervals until the automobile 300 has been found, at which time the police 360 can notify the AESA system 322 through the WEB-based interface 350, which can then notify the calling subscriber, e.g., by ringing back the original calling number or by accessing the subscriber's voice mail system (not shown) and leaving a message indicating that the automobile 300 has been found.

Alternatively, if the password and security code information 312 is stored within the SIM card 318 of the MS 310 itself, the MS 310 itself can request positioning of itself by the positioning center 340. The location information can then be sent either by the positioning center 340 or by the MS 310 via the serving MSC 320 to the local law enforcement agency 360.

Furthermore, if the subscriber is "car jacked" and held hostage inside the automobile 300, the subscriber could press a button (not shown) connected to the MS or RIU 310, which would instruct the MS 310 to begin the positioning process and to notify the police 360, either by directly requesting the positioning or by accessing the AESA system 322. Alternatively, the subscriber may periodically notify the system 322, e.g., by pressing the aforementioned button, and by failing to so notify within a predetermined time period, may activate the positioning process and notification of the police. This can be especially useful if the subscriber feels "uneasy" driving through a certain area. The notification process could be activated or deactivated by pressing function keys (not shown) on the MS 310.

As will be recognized by those skilled in the art, the innovative concepts described in the present application can be modified and varied over a wide range of applications. Accordingly, the scope of patented subject matter should not be limited to any of the specific exemplary teachings discussed.

For example, it should be understood that the aforementioned cellular interface can be applied to any type of vehicle, including, but not limited to, cars, trucks, motor homes, tractor trailers, boats, planes, motorcycles, or any other vehicle having an electrical system which can be interfaced with the cellular network.

What is claimed is:

1. A telecommunications system for interfacing with an electrical system within a vehicle using a cellular network, said telecommunications system comprising:

a mobile switching center adapted to connect a call to an access system, said access system being adapted to receive said call and a service code, said service code having an instruction associated therewith;

a radio interface unit within said vehicle in wireless communication with said mobile switching center, said radio interface unit being adapted to conditionally receive said instruction associated with said service code from said access system, said radio interface unit not receiving said instruction when said instruction is a positioning request; and a power interface unit connected to said radio interface unit and said electrical system, said power interface unit being adapted to receive said instruction associated with said service code from said radio interface unit and interface to said electrical system to perform said instruction on said electrical system.

2. The telecommunications system of claim 1, wherein said radio interface unit and said power interface unit are co-located.

3. The telecommunications system of claim 1, wherein said radio interface unit comprises a mobile terminal and a cell interface device, said cell interface device being connected to said power interface unit, said mobile terminal being removable from said cell interface device.

4. The telecommunications system of claim 3, wherein said access system is located within a memory within said mobile terminal.

5. The telecommunications system of claim 4, wherein said memory is a Subscriber Identity Module card.

6. The telecommunications system of claim 1, wherein said call is from a subscriber associated with said radio interface unit, said access system further receiving a password from said subscriber, said password allowing said subscriber to access said access system.

7. The telecommunications system of claim 1, wherein said instruction associated with said service code is selected from the group consisting of: "activate car alarm", "deactivate car alarm", "turn off head lights", "unlock doors", "lock doors", "start engine", "turn on heater", "turn on air conditioner", "turn off engine", "flash headlights", and "blow horn".

8. The telecommunications system of claim 1, wherein said instruction associated with said service code is associated with an electrical device within said electrical system, said power interface unit interfacing with said electrical device to perform said instruction.

9. The telecommunications system of claim 1, further comprising a base station system connected to said mobile switching center and in wireless communication with said radio interface unit.

10. The telecommunications system of claim 1, wherein said instruction associated with said service code is sent to said radio interface unit using a Short Message Service message.

11. The telecommunications system of claim 1, wherein said instruction associated with said service code is sent to said radio interface unit using an Unstructured Supplementary Service Data message.

12. The telecommunications system of claim 1, wherein said access system determines the location of said radio interface unit within said vehicle when said instruction is said positioning request.

13. The telecommunications system of claim 12, wherein said access system determines the location of said radio interface unit by sending said positioning request to a positioning center, said positioning center determining the location of said radio interface unit and sending the location to said access system.

14. The telecommunications system of claim 12, wherein said access system connects to a law enforcement center via a WEB-based interface, the location of said radio interface unit being sent to said law enforcement center.

15. The telecommunications system of claim 1, wherein said access system is located within said mobile switching center.

16. A method for interfacing with an electrical system within a vehicle using a cellular telecommunications system, said method comprising the steps of:
   receiving, by a mobile switching center within said cellular telecommunications system, a call to a radio interface unit within said vehicle, said mobile switching center being in wireless communication with said radio interface unit;
   connecting said call, by said mobile switching center, to an access system within said cellular telecommunications system;
   receiving, by said access system, a service code;
   conditionally sending, by said access system, an instruction associated with said service code to said radio interface unit, said step of sending said instruction not being performed when said instruction is a positioning request;
   sending, by said radio interface unit, said instruction to a power interface unit connected to said radio interface unit and said electrical system; and
   performing, by said power interface unit, said instruction on said electrical system.

17. The method of claim 16, wherein said radio interface unit and said power interface unit are colocated.

18. The method of claim 16, wherein said radio interface unit comprises a mobile terminal and a cell interface device, said cell interface device being connected to said power interface unit, said mobile terminal being removable from said cell interface device.

19. The method of claim 18, wherein said access system is located within a memory within said mobile terminal.

20. The method of claim 19, wherein said memory is a Subscriber Identity Module card.

21. The method of claim 16, wherein said call is from a subscriber associated with said radio interface unit, and further comprising, before said step of receiving said service code, the step of:
   receiving, by said access system a password from said subscriber, said password allowing said subscriber to access said access system.

22. The method of claim 16, wherein said instruction associated with said service code is selected from the group consisting of: "activate car alarm", "deactivate car alarm", "turn off head lights", "unlock doors", "lock doors", "start engine", "turn on heater", "turn on air conditioner", "turn off engine", "flash headlights", and "blow horn".

23. The method of claim 16, wherein said instruction associated with said service code is associated with an electrical device within said electrical system, said step performing said instruction being performed by said power interface unit interfacing with said electrical device.

24. The method of claim 16, wherein said step of sending said instruction associated with said service code to said radio interface unit is performed by using a Short Message Service message.

25. The method of claim 16, wherein said step of sending said instruction associated with said service code to said radio interface unit is performed by using an Unstructured Supplementary Service Data message.

26. The method of claim 16, further comprising, after said step of receiving said service code, the step of:
   determining, by said access system, the location of said radio interface unit within said vehicle when said instruction is said positioning request.

27. The method of claim 26, wherein said step of determining the location of said radio interface unit is performed by said access system sending said positioning request to a positioning center, said positioning center determining the location of said radio interface unit and sending the location to said access system.

28. The method of claim 26, further comprising, after said step of determining the location of said radio interface unit, the steps of:
   connecting, by said access system, to a law enforcement center via a WEB-based interface; and
   sending, by said access system, the location of said radio interface unit to said law enforcement center.

29. The method of claim 16, wherein said access system is located within said mobile switching center.

* * * * *